A., S. & H. MAINARDI.
TRAIN STOPPING SYSTEM.
APPLICATION FILED DEC. 5, 1913.

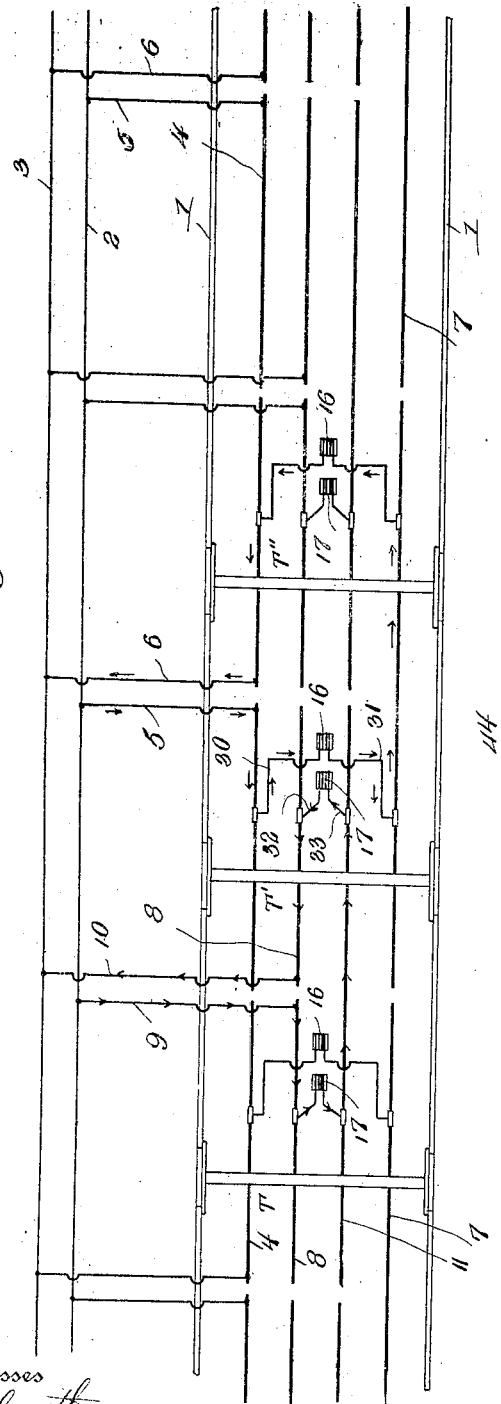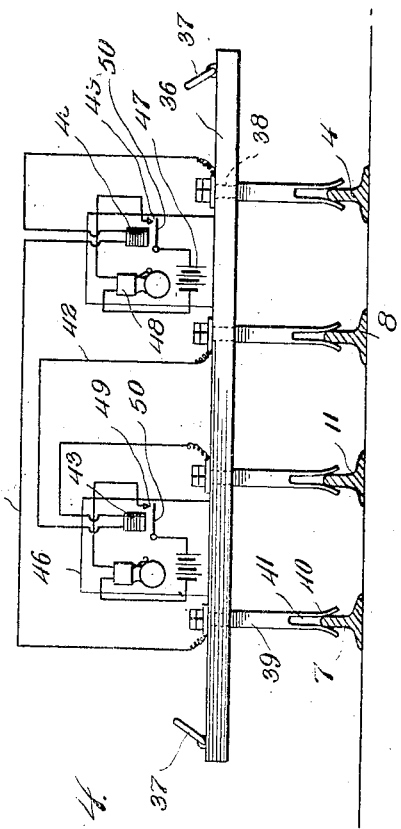

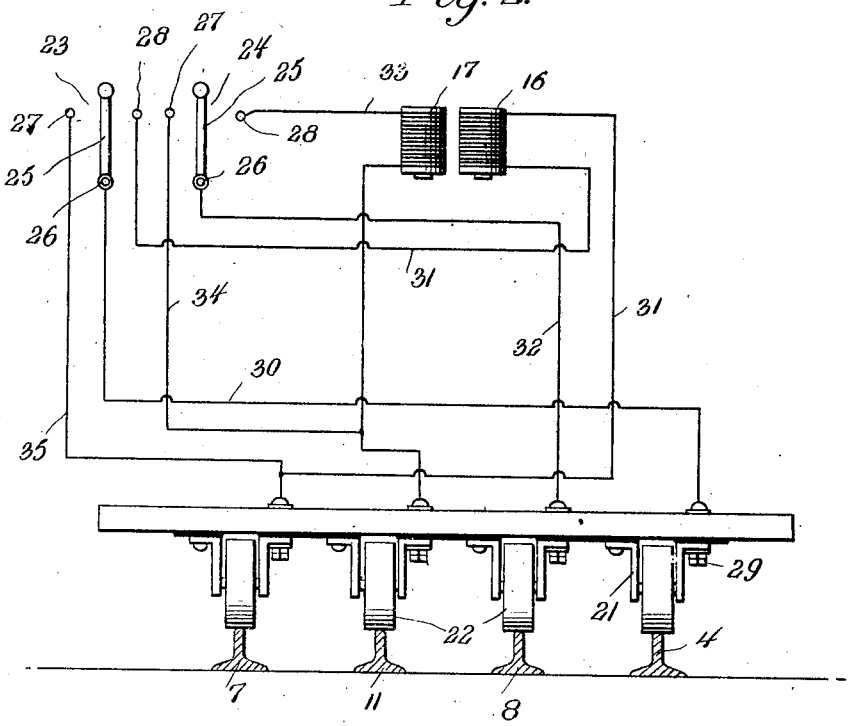
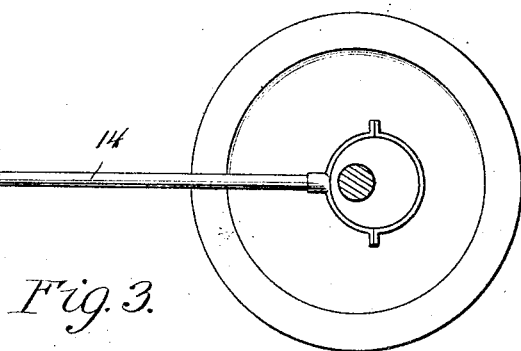

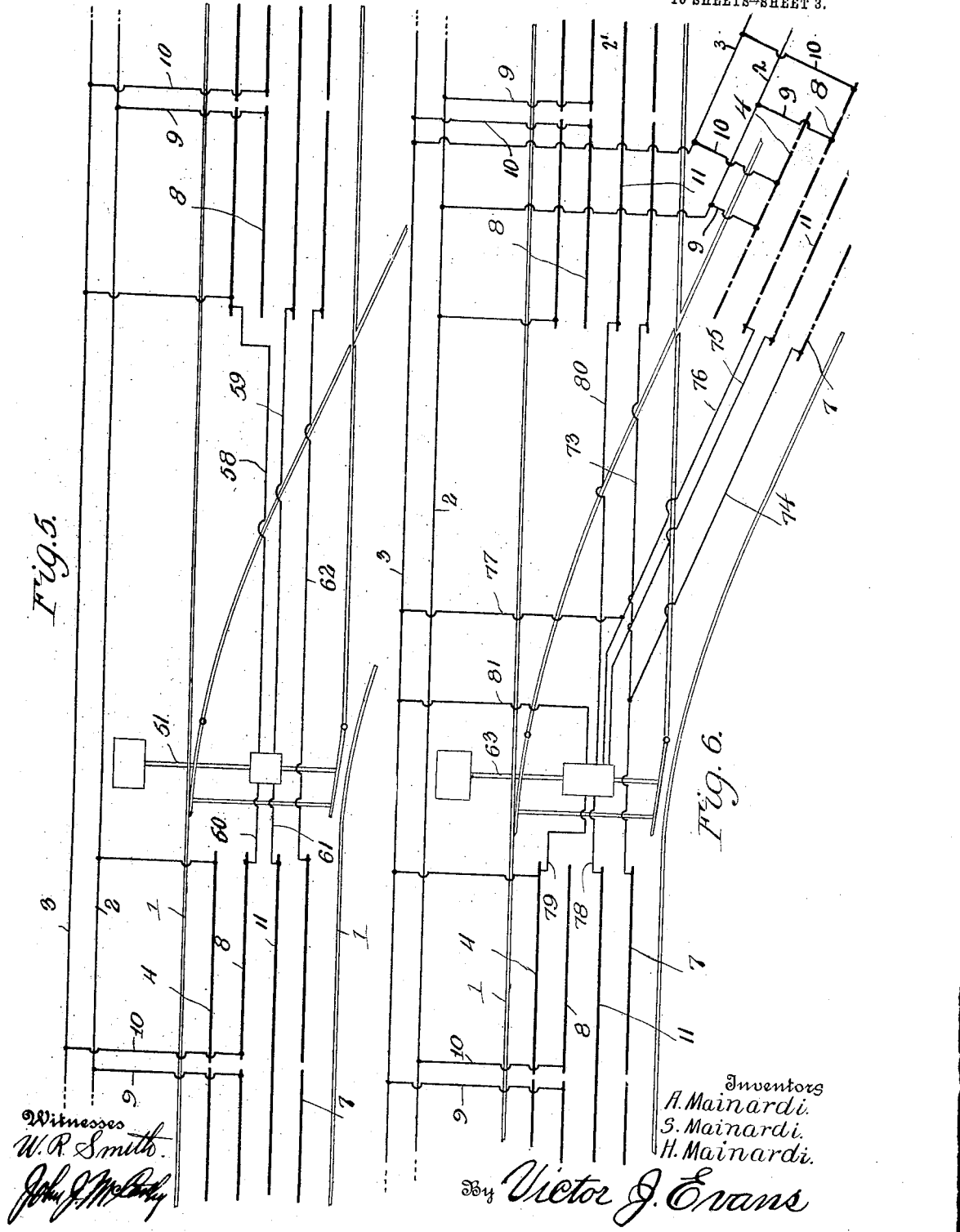

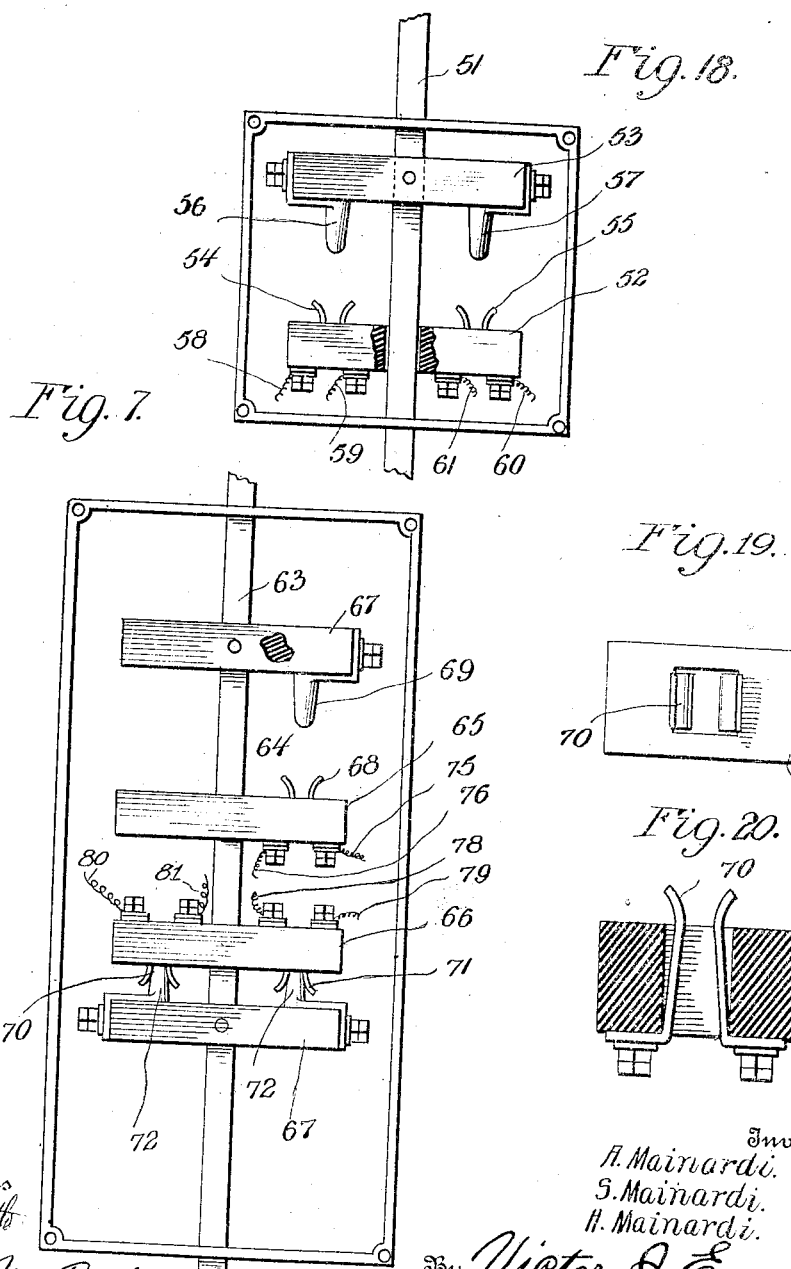

1,131,536.

Patented Mar. 9, 1915.
10 SHEETS—SHEET 5.

Fig. 21.

Fig. 8.

Witnesses
W. R. Smith
John J. McCarthy

Inventors
A. Mainardi.
S. Mainardi.
H. Mainardi.
By Victor J. Evans
Attorney

A., S. & H. MAINARDI.
TRAIN STOPPING SYSTEM.
APPLICATION FILED DEC. 5, 1913.
1,131,536.
Patented Mar. 9, 1915.
10 SHEETS—SHEET 6.
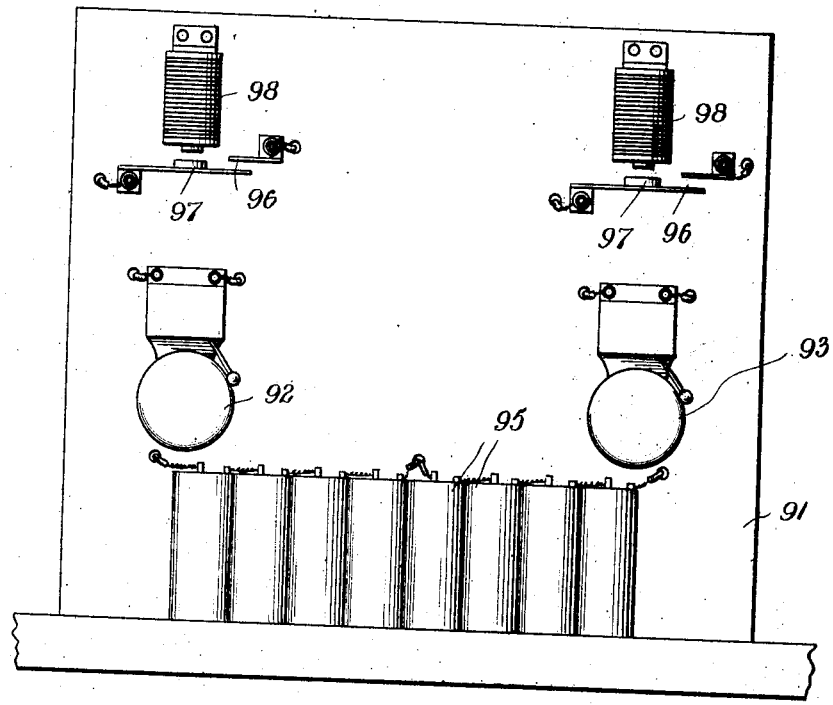
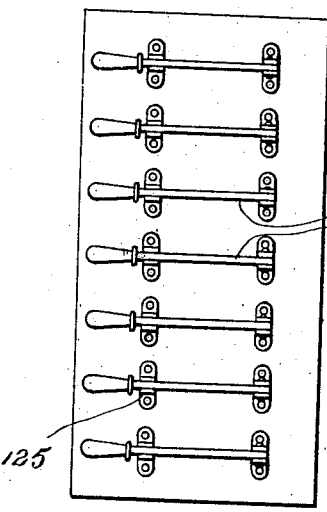
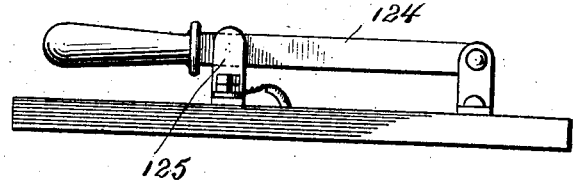
Witnesses
W. R. Smith
John J. McCarthy
Inventors
A. Mainardi.
S. Mainardi.
H. Mainardi.
By Victor J. Evans
Attorney

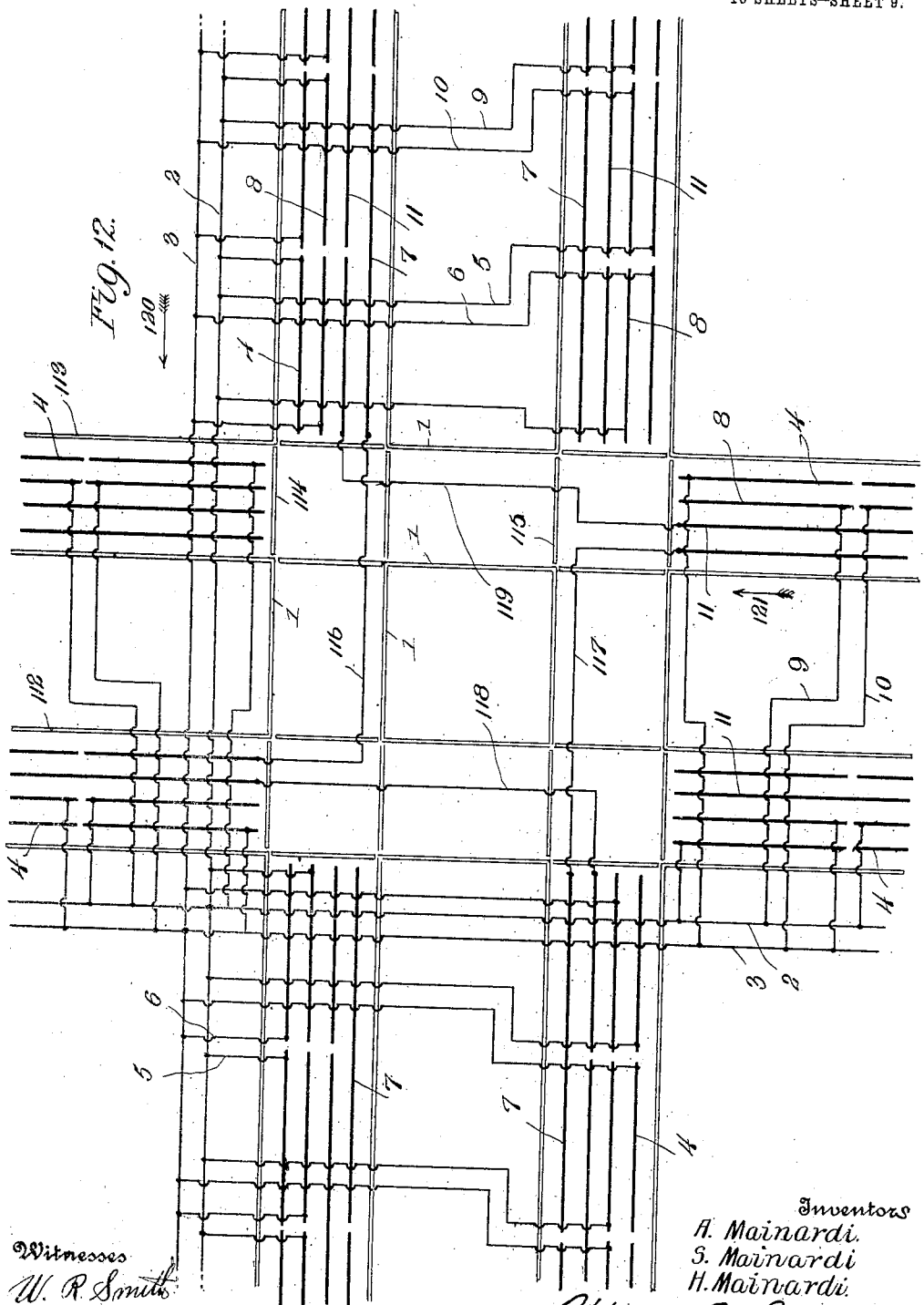

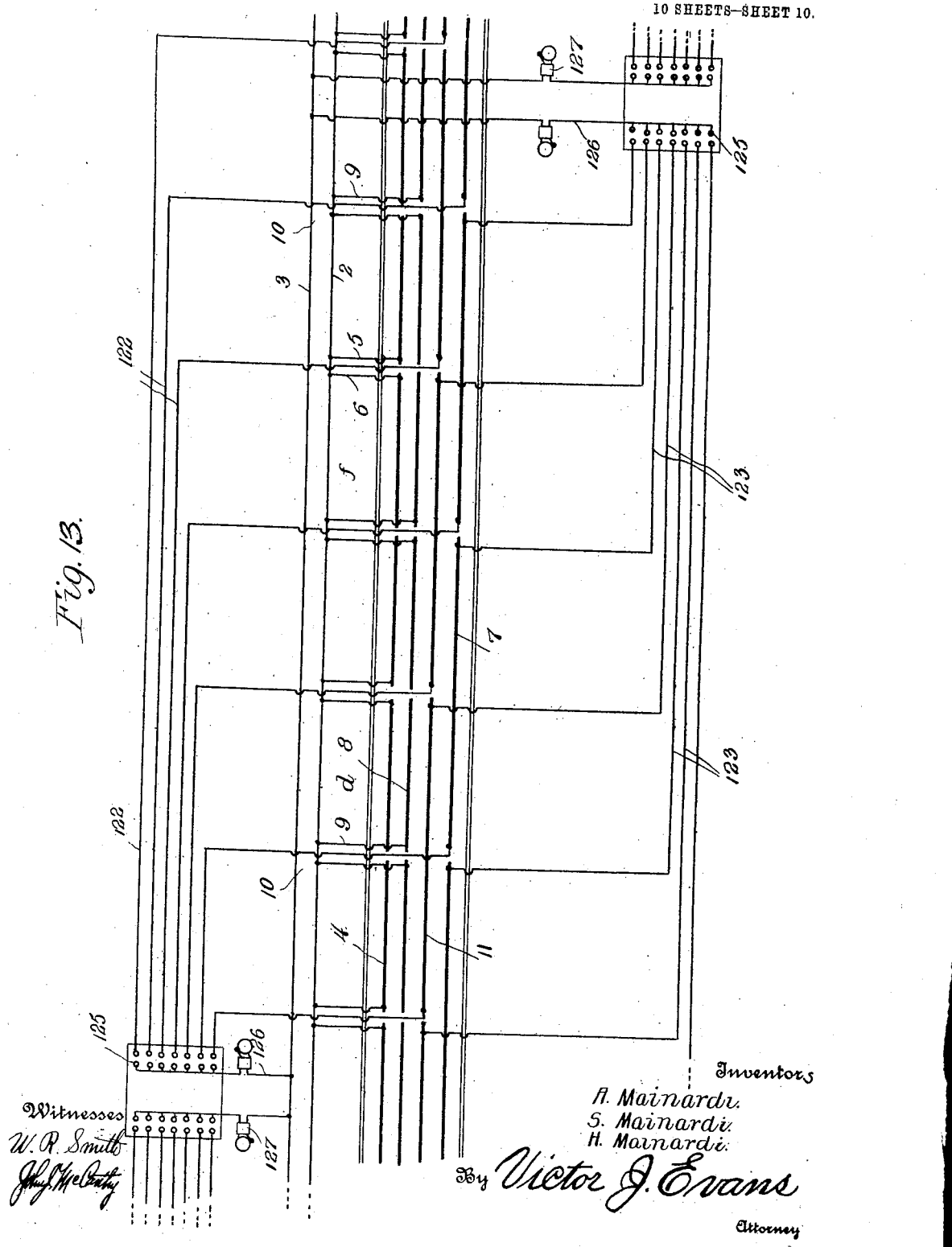

UNITED STATES PATENT OFFICE.

ANGELO MAINARDI, SEVERINO MAINARDI, AND HENRY MAINARDI, OF PATERSON, NEW JERSEY, ASSIGNORS OF ONE-FIFTH TO JOHN MAINARDI AND ONE-FIFTH TO VITTORIO MAINARDI, BOTH OF PATERSON, NEW JERSEY.

TRAIN-STOPPING SYSTEM.

1,131,536.  Specification of Letters Patent.  Patented Mar. 9, 1915.

Application filed December 5, 1913. Serial No. 804,815.

*To all whom it may concern:*

Be it known that we, ANGELO MAINARDI, SEVERINO MAINARDI, and HENRY MAINARDI, subjects of the King of Italy, residing at Paterson, in the county of Passaic and State of New Jersey, have invented new and useful Improvements in Train-Stopping Systems, of which the following is a specification.

This invention relates to improvements in automatic train stopping systems and has particular application to an electrically controlled system of this type.

In carrying out the present invention, it is our purpose to provide a system of the class described whereby head on and rear end collisions will be prevented; the danger of running into open switches and collisions between trains on the main line and those passing from a siding or branch line onto the main line eliminated; collisions at grade crossings and highway crossing avoided; and whereby a station agent may bring any train or car operating between his station and the adjacent stations to a standstill.

It is also our purpose to provide a train stopping system which will operate efficiently and effectively under all traffic conditions and which when once installed may be maintained at a minimum expense.

With the above and other objects in view, the invention consists in the construction, combination and arrangement of parts hereinafter set forth in and falling within the scope of the claims.

Figure 10:
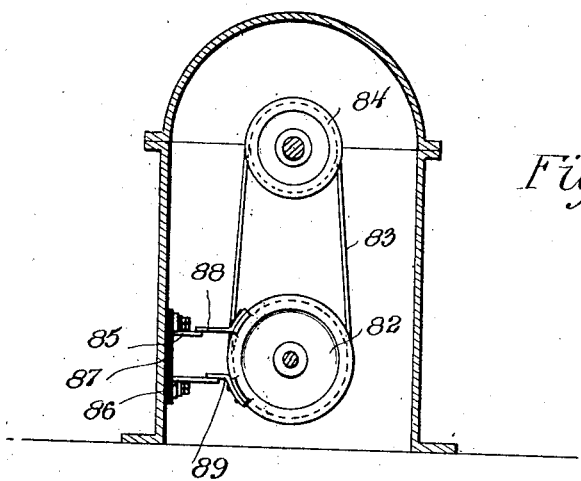
Figure 16:
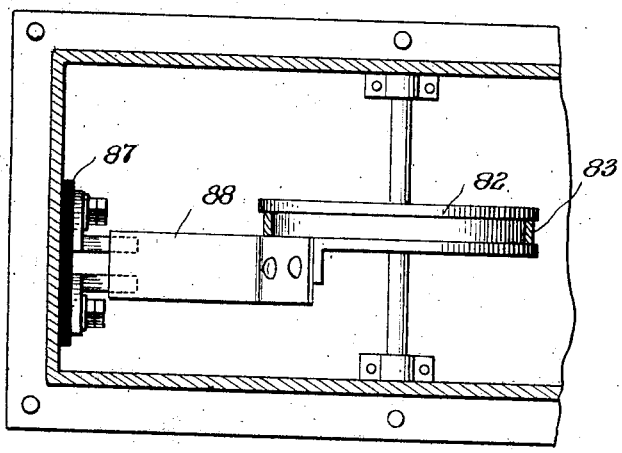
Figure 17:
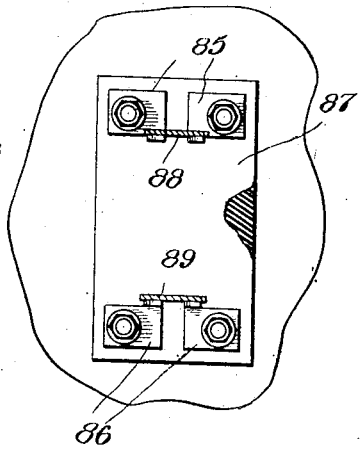
Figure 11:
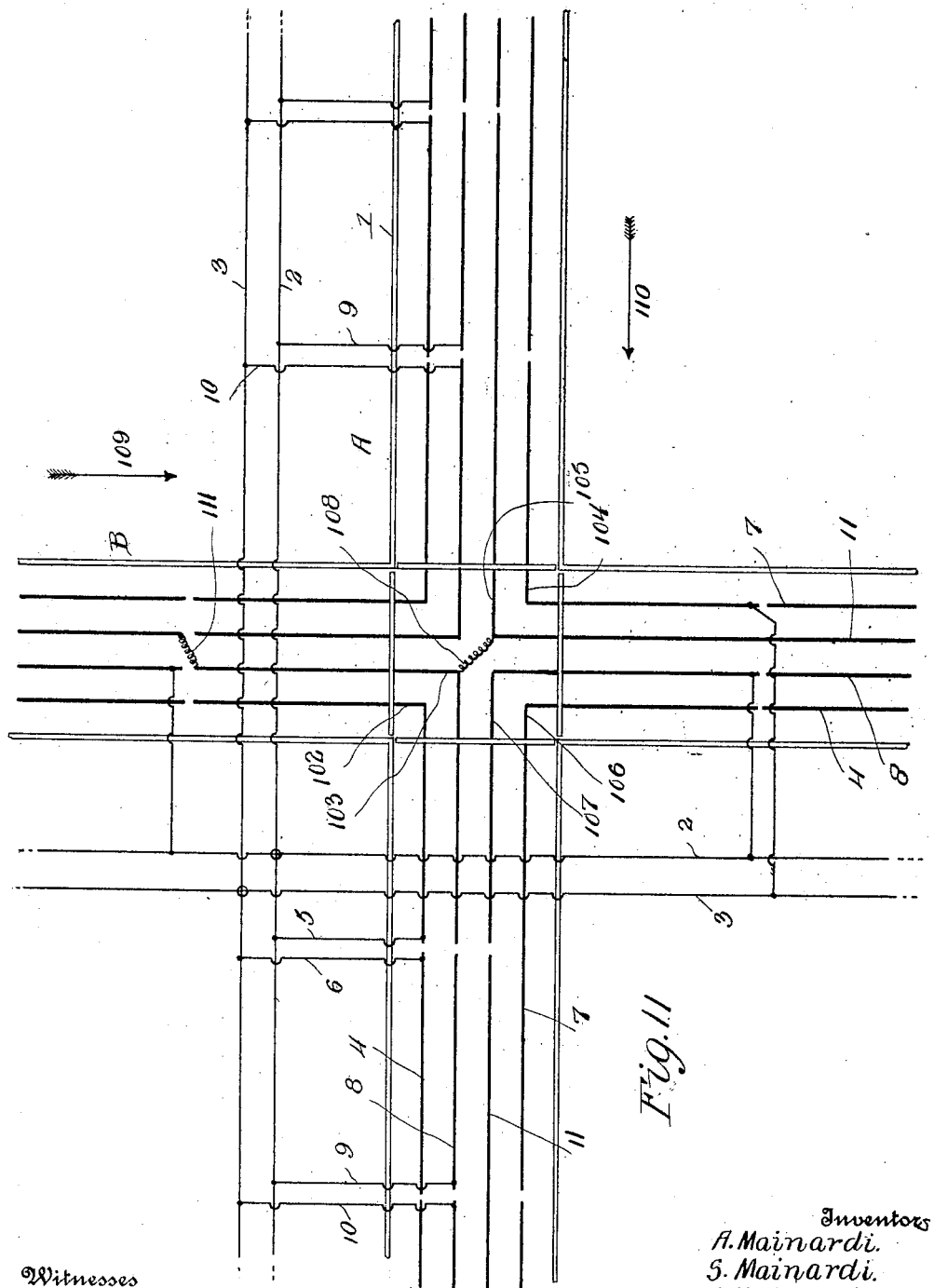

In the accompanying drawings; Figure 1 is a diagrammatic view of a train stopping system constructed in accordance with the present invention. Fig. 2 is a similar view of the car carried devices. Fig. 3 is a plan view of one of the car carried devices showing the same on an enlarged scale. Fig. 4 is a diagrammatic view showing the means for protecting a section gang working on the trackway. Fig. 5 is a diagrammatic view showing the arrangement of the circuits at a siding switch. Fig. 6 is a similar view showing the circuit connections at the switch of a branch line. Fig. 7 is a plan view of the railway switch controlled circuit closer. Fig. 8 is a diagrammatic view showing the arrangement of the circuits at a highway crossing. Fig. 9 is a plan view of the alarm devices controlled by the highway gate. Fig. 10 is a view in elevation of the gate operated switches. Fig. 11 is a diagrammatic view showing the circuit connections at the grade crossing of single track railroads. Fig. 12 is a similar view showing the arrangement of the circuits at the grade crossing of double railroads. Fig. 13 is a diagrammatic view showing the station agent's controlling circuits. Fig. 14 is a view in front elevation showing the arrangement of switches within each station. Fig. 15 is a view in side elevation of one of the switches. Fig. 16 is a horizontal sectional view through the casing of the mechanism of the highway gate showing the gate controlled switches in top plan. Fig. 17 is a vertical sectional view through the gate controlled switches. Fig. 18 is a plan view of the railway switch controlled circuit closer located at the siding switch. Fig. 19 is a fragmentary plan view of a detail thereof. Fig. 20 is a longitudinal sectional view through the detail shown in Fig. 20. Fig. 21 is a transverse sectional view through the device illustrated in Fig. 3.

Referring now to the drawings in detail, 1, 1 designate parallel lines of rails forming the trackway, while 2, 3 designate a feeder and return wire respectively connected with a suitable source of electrical energy. Arranged longitudinally of the trackway and, in the present instance, disposed between the lines of rails thereof is a set of contact rails 4, alternate rails of the set 4 being connected with the feeder 2 by means of wires 5, while the remaining contact rails are connected with the return wire 3 by way of wires 6, the confronting ends of the contact rails being appropriately spaced apart. In this instance, the set of contact rails 4 is disposed adjacent to the tread side of one line of rails 1, while a second set of contact rails 7 are disposed adjacent to the tread side of the opposite line of rails and coöperates with the set 4. Each contact rail of the sets 7 is of a length equal to the combined lengths of two contact rails of the set 4 and one rail 7 is disposed alongside of every two rails of the set 4 connected with the feeder 2 and the return wire 3. Adjacent to the set of contact rails 4 is a set of contact rails 8 alternate rails of the set 8 being connected with the feeder by way of wires 9, while the remaining rails of the set 8 are connected with the return wire by way of wires 10, each rail of the set 8 being arranged alongside of a rail of the set 4 and of a length corresponding thereto. Arranged adjacent to and inwardly of the set of contact rails 7 and designed to coöperate with the set of rails 8 is a set of contact rails 11 disposed longitudinally of the trackway and having the confronting ends thereof suitably spaced apart. Each contact rail of the set 11 is disposed adjacent to two rails of the set 8 connected with the feeder and return wires 2, 3 respectively, while the rails of the set 11 are staggered relatively to those of the set 7.

In this embodiment of our invention, the car carried stopping mechanism comprises a substantially rectangular block 12 mounted for sliding movement within guides 13, 13 and connected through the medium of a rod 14 with a crank or eccentric on a revolving element of the motor car. Slidably mounted within the guides 13, 13 in advance of the block 12 is a cross head 15 carrying magnets 16, 17 having the pole faces thereof confronting an armature 18 on the free end of the block 12. Connected with the cross head 15 is a rod 19 having suitable connections 20 with the throttle valve of the engine and the handle of the engineer's brake valve. Under normal conditions, the block 12 reciprocates within the guides 13, 13 under the action of the rod 14 and the rotating part of the motor car and the poles of the magnets 16, 17 are spaced a suitable distance from the end of the path of movement of the block so that the cross head and the rod 19 are uninfluenced by the sliding block. On the other hand, when one or the other magnets 16, 17 is energized, the pole face thereof is drawn into engagement with the armature 18 on the adjacent end of the block 12 so that the cross head and the block are, in effect, rigidly connected together. When this connection is established the rod 19 slides back and forth under the action of the cross head and the block and in its initial movement closes the throttle valve and manipulates the engineer's brake valve to cause a reduction in the pressure in the train line air pipe.

Depending from the under surface of the motor car and spaced apart transversely thereof are yokes 21 and journaled in horizontally alining bearings carried by each yoke is an axle upon which is fixed a wheel 22 designed to act as a current collector. The wheels 22 correspond in number to the number of sets of contact rails along the trackway and the peripheries thereof bear upon the respective lines of contact rails. Disposed within the cab of the locomotive within convenient reach of the engineer are switches 23, 24, each comprising a blade 25 pivoted as at 26, and contacts 27, 28 disposed at opposite sides of the blade in the path of movement thereof. Each yoke 21 is equipped with a binding screw 29 and from the binding screw 29 of the yoke carrying the wheel bearing upon the set of contact rails 4 leads a conductor 30 terminally connected to the pivot 26 of the blade of the switch 23. Leading from the contact 28 of the switch 23 is a wire 31 extending through the winding of the magnet 16 and connected to the binding screw of the yoke carrying the wheel bearing upon the set of contact rails 7. From the binding screw of the yoke carrying the wheel bearing upon the set of contact rails 8 leads a wire 32 tapped onto the pivot point of the blade 25 of the switch 24, while a wire 33 extends from the contact 28 of the switch 24 through the winding of the magnet 17 and is connected with the binding post of the yoke carrying the wheel 22 bearing upon the set of contact rails 11. From the contact 27 of the switch 23 leads a wire 34 tapped onto the binding screw of the wire 31, while from the contact 27 of the switch 24 leads a wire 35 connected with the binding post of the wire 33.

In operation, assuming two trains to be approaching each other as illustrated diagrammatically in Fig. 1 by the trains T and T', the trains T and T' will be brought to a standstill as soon as the respective contact rollers 22 thereon ride into engagement with the same contact rail of the set 11, the electric current flowing from the feeder 2 by way of the respective wire 9, a contact rail of the section 8, through the wire 32 connected with the respective contact roller of the train T, the switch blade 25 of the switch 24, the contact 28, the wire 33 and magnet 17, the contact roller 22 bearing upon the contact rail of the set 11 and then back to the return wire 3 by way of the contact roller 22 of the train T', the wire 33 and magnet 17, the contact 28 and switch blade 25, the wire 32, contact roller 22 bearing upon the contact rail of the set 8 and the respective wire 10. As the magnets 17 on the two trains are energized, the cross head 15 is moved toward the block 12 incident to the poles of the magnets engaging the armatures and in the sliding movement of the block the rod 19 is pulled with the effect to close the throttle valve and manipulate the engineer's brake valve as previously described. On the other hand, should a train approach the train T' from the rear as shown diagrammatically by the train T² in Fig. 1, the magnets 16 on the trains T' and T² will be energized so as to bring these trains to a stop, current flowing from the feeder 2, through the wire 5, the respective contact rail of the set 4, the roller 22 on the train T' in engagement with such contact rail, the wire 30, switch blade 25, contact 28, wire 31 and winding of the magnet 16, contact roller 22 bearing upon the respective contact rail of the set 7, the roller 22 of the train T² bearing on such contact rail of the set 7, wire 31 and winding of magnet 16, contact 28 and switch blade 25 of the switch 23, wire 30 and then back to the return wire 3 by way of the contact roller 22, contact rail of the set 4 and wire 6. Thus, the magnets 16, 16 on the trains T' and T² will be energized with the effect to bring such trains to a standstill, it of course being understood that the magnets 16, 16 are not energized until the respective contact rollers 22 on the trains T' and T² engage the same contact rail of the set 7.

Normally, the blades 25 of the switches 23 and 24 on each motor car are in engagement with the respective contacts 28 so that when two motor cars come within the danger zone the magnets will be energized as previously described. Should the engineer or motorman of a train or car desire to proceed succeeding the automatic stopping of the train, such engineer, after locating the position of the other car or train, throws the blade 25 of the respective switch out of engagement with the contact 28 and into engagement with the respective contact 27, thereby breaking the circuit through the energized magnet and forming a path for the current so that the magnet on the other train will remain energized. For instance, should the engineer of the train T', after being advised that the train T² is a following train, desire to proceed, such engineer throws the blade 25 of the switch 23 into engagement with the contact 27 thereby breaking the continuity of the circuit of the magnet 16 and deënergizing the latter and establishing a path for the current around the magnet 16 by way of the conductors 30 and 35 connected with the same contact rollers as the conductors feeding the magnet 16. Thus, the stopping mechanism on the train T' will be rendered inactive while that on the train T² will be maintained active so that the train T' may move out of the danger zone.

In Fig. 4 of the drawings, we have illustrated a device whereby section hands working on the trackway will be protected against trains operating over the trackway in both directions. In the present instance, this device comprises a beam 36 provided adjacent to its opposite ends with handles 37, 37 and formed with a series of apertures 38 spaced apart distances equal to the distances between the sets of contact rails 4, 8, 11 and 7. Disposed within each aperture 38 is a conducting rod 39 having the lower end thereof equipped with a yoke 40, the opposite limbs of the yoke diverging outwardly of each other to form an entrance mouth 41. Connected to the upper extremities of the innermost conducting rods 39 are the terminals of a conductor 42 including in series an electromagnet 43, while connected to the upper ends of the outermost conducting rods 39 are the terminals of a conductor 44 including in series a magnet 45. Each electromagnet 43, 45 is arranged within a casing 46 carried by the beam 36 and also disposed within each casing is a local circuit including a battery 47 and a bell 48 and having the opposite terminals thereof connected with overlapping spring contact strips 49 normally spaced apart. Upon the lower extremities of the strip 49 is an armature 50 disposed within the influence of the respective magnet. In the use of the device illustrated in Fig. 4, the yoked ends of the conducting rods 39 are engaged with the respective rails of the sets 4, 8, 11 and 7 and should a train approach the device from one direction the circuit will be closed through the magnet 45 whereby the local circuit within the respective casing 46 will be closed and the bell sounded. Should the train approach the device from the opposite direction the circuit will be closed through the magnet 43 whereby the local circuit within the other casing will be closed and the bell sounded, current flowing through these various circuits substantially as previously described.

In Fig. 5 of the drawings, we have shown an arrangement for protecting cars at siding switches and in this instance, the switch throwing rod 51 has control of a circuit closer comprising a stationary block 52 suitably fastened to the road bed of a track tie and a movable block 53 fastened to the switch throwing rod and movable toward and away from the block 52. Secured to one face of the block 52 are jacks 54, 55, while carried by the confronting face of the block 53 are plugs 56, 57 adapted to engage the jacks 54, 55 respectively when the switch is open to the siding. The sets of contact rails 4, 8, 11 and 7 are split at the switch and leading from the adjacent rail of the set 8 in advance of the switch point is a wire 58 connected with the adjacent jack 54 while leading from such jack is a wire 59 connected with the adjacent contact rail of the set 11. At the opposite side of the switch the adjacent rail of the set 4 is connected by way of a wire 60 with the jack 55, while a second wire 61 leads from the last-mentioned jack and connects with the adjacent rail of the set 11, the sections of the split rail of the set 7 being connected to each other by way of a wire 62 so that the electrical continuity of the split rod will be unbroken. When the switch point is thrown to open the siding to the main line, the block 53 moves toward the block 54 and the plugs 56, 57 on the movable block engage in the jacks 54 and 55 respectively thereby placing the adjacent rails of the sets 8 and 11 in advance of the switch and the adjacent rails of the sets 4 and 11 beyond the switch in electrical communication with one another. Thus, should a train approach the open switch on the main line the magnet 17 of such train will be energized incident to the contact rollers connected with such magnet riding onto the respective contact rails of the sets 8 and 11, current flowing from the feeder, through the wire 9, the respective rail of the set 8, the magnets, the respective rail of the set 11, the wire 59, the bridged jack 54, the wire 58 and back to the return wire by way of the respective section of the set 8 and the wire 10. Under the same circumstances should a train approach the switch from the rear the circuit will be closed through the magnet 17 on such train incident to the contact wheels connected with such magnet engaging the contact rails of the sets 8 and 11 adjacent to the switch, current flowing from the feeder, through the wire 9, the respective contact rail of the set 8, the magnet, the contact rail of the set 11, the wire 61, the bridged jack 55 and the wire 60 connected with the respective contact rail of the set 4.

In Fig. 6 of the drawings there is shown an arrangement for protecting traffic at a switch leading from the main line to a branch line and in this form of the invention, the switch throwing bar 63 controls a circuit closer comprising a base 64 fastened to a suitable stationary support and arranged transversely of the trackway below the switch throwing bar 63. Adjacent to the opposite ends of the base 64 are blocks 65, 66 appropriately spaced apart, while depending from the switch throwing bar and suitably secured thereto is a block 67 disposed between the blocks 65 and 66 and movable with the switch throwing bar 63. One face of the block 65 is equipped with a jack 68 adapted to be engaged by a plug 69, carried by the confronting face of the block 67, when the switch throwing bar is moved to close the switch. Secured to the inner face of the block 66 are jacks 70, 71 adapted to be engaged by plugs 72, 72, carried by the confronting face of the block 67, when the switch point is moved to open position. The sets of contact rails of the main line are split at the switch, while the sets of contact rails of the branch line terminate in proximity to the switch and the split sections of the respective contact rail of the set 7 of the main line are electrically connected with each other by means of a wire 73 and tapped onto such wire 73 is a wire 74 connected with the adjacent contact rail of the set 7 of the branch line. Leading from the adjacent contact rails of the sets 11 and 8 of the branch line are conductors 75, 76 respectively terminating in the jack 68 on the block 65, while tapped onto the conductor 76 is a conductor 77 connected with the return wire 3. Connected with the respective contact rail of the set 11 in advance of the switch is a conductor 78 terminating in the jack 71 on the block 66 and leading from the jack is a conductor 79 connected with the common return wire. From the jack 70 leads a conductor 80 tapped onto the respective contact rail of the set 11 beyond the switch, while connecting the jack 70 with the common return wire is a conductor 81. Thus, when the switch is open to the branch line as indicated in Fig. 6, the plugs 72, 72 on the block 67 are in engagement with the jacks 70, 71 on the block 66 of the circuit closer so that a train approaching the open switch from the rear will be brought to a standstill when passing over the second contact rail of the set 8 from the switch, current flowing from the feeder, through such rail, the respective magnet on the motor car, the respective contact rail of the set 11, the conductor 80, the bridged jack 70 and back to the common return wire by way of the wire 81. On the other hand, when the train on the main line approaches the open switch from the front, such train will be brought to a standstill previous to entering the zone of the switch incident to the bridging of the contact rails of the sets 8 and 11 immediately in advance of the switch, current flowing from the respective rail of the set 8, through the respective magnet on the train, the contact rail of the set 11, the wire 78, the bridged jack 71, and back to the common return wire by way of the wire 79. On the other hand, when the switch is closed to the branch line, the plug 69 is in engagement with the jack 68 on the block 65 so that should a train approach the closed switch from the branch line, such train will be automatically stopped upon passing over the contact rail of the set 8 from the switch, current flowing from the feeder, 2, through the wire 9 into such contact rail through the particular magnet on the motor car, the coöperating contact rail of the set 11, the wire 75, the bridged jack 68, the respective portion of the conductor 76 and back to the return wire 3 by way of the wire 77. Should two trains approach the switch simultaneously, one of such trains operating on the main line and the other train on the branch line, both trains will be stopped owing to the connections between the contact rail of the set 7 of the siding and the similar rail of the set 7 of the main line, current flowing from the feeder, through the contact rail of the set 4 of the branch line, the respective magnet of the motor car on the branch line, the contact rail of the set 7, the wire 74 and the respective portion of the wire 73, the contact rail of the set 7 on the main line in advance of the switch, through the respective magnet of the motor car on the main line and then back to the return wire by way of the contact rail of the set 4 in advance of the switch and the wire 6.

At highway crossings, the sets of contact rails of the trackway are split and terminate at each side of the crossing, as illustrated in Fig. 8, and the crossing gate controls a circuit closer comprising a disk 82 journaled upon a horizontal shaft within the casing of the gate and connected through the medium of a belt 83 with a pulley 84 keyed to the shaft of the gate, and pairs of contacts 85, 86 fast upon a base board 87 secured to one side wall of the casing, the contacts of each pair 85, 86 being spaced apart from each other. Fixed upon the opposite faces of the disk 82 are bridging strips 88, 89 adapted when the disk 82 is moved under the action of the disk 84 to bridge the contacts of the pairs 85, 86, respectively. Normally, that is when the gate is elevated or in inactive position, the bridging strips 88, 89 bridge the contacts of the pairs 85 and 86, while when the gate is lowered motion is transmitted to the disk 82 through the medium of the disk 84 and belt 83 disengaging the bridging strips from the contacts. Located at the crossing is the gatekeeper's housing 90 and within such housing is a base board 91 equipped with two electric bells 92, 93, each connected in a local circuit 94 including a suitable source of energy as a battery 95 and terminating in overlapping spring contacts 96 normally spaced apart. One of the contacts 96 is equipped with an armature 97 disposed within the influence of a magnet 98. The magnet 98 controlling the local circuit of the bell 92 has one terminal connected to one of the contacts of the pair 85 and the opposite terminal connected with the common return wire 3, while leading from the remaining contact of the pair 85 is a conductor 99 tapped onto the contact rail of the set 7 at one side of the crossing. From the contact rail of the set 7 at the opposite side of the crossing leads a conductor 100 connected to one of the contacts of the pair 86, and from the remaining contact of the pair 86 leads a conductor 101 extending through the winding of the magnet 98 controlling the bell 93 and tapped onto the common return wire. By means of this construction, it will be seen that should a train approach the crossing from the right in Fig. 8 and the gate remain open, such train will be brought to a standstill when the respective contact roller thereon rides into engagement with the second conductor rail of the set 4 from the crossing, current flowing from the feeder, through the respective conductor rail, the respective magnet on the car, the conductor rail of the set 7, the conductor 99, the bridged contacts 85 and then through the winding of the magnet 98 controlling the bell 93 and back to the common return wire. Thus, the local circuit of the bell 92 will be closed and the gateman advised of the stopping of the train and the position of the gate. On the other hand, should the gate be down, the circuit, just described, will be broken and the train permitted to pass the highway. Should the train be traveling in the reverse direction and the gate open the bell 92 will be sounded, as will be readily understood from Fig. 8, the pair of contacts 86 being bridged by the bridging strip 89 on the disk 82.

At grade crossings of single track railways, we connect certain of the various sets of contact rails of the trackways as illustrated in Fig. 11. In this figure, A and B designate the intersecting lines of the railways and, as illustrated, the common return wire 3 of the trackway B is connected with the similar wire of the trackway A, while the feeders of the two railways are also connected to each other. The contact rails of the sets 4 of the two railways at one side of the crossing are joined together at the point of intersection as at 102, while the contact rails of the set 8 at the point of intersection at one side of the crossing are joined together as at 103. Likewise, the contact rails of the sets 7 and 11 at the opposite side of the crossing are joined together as at 104 and 105 respectively. The remaining contact rails of the sets 4 and 8 of each railway are joined to the adjacent contact rails of the sets 7 and 11 respectively of the other trackway, as at 106 and 107, while the joined contact rails of the sets 11 at one side of the crossing are connected to the joined contact rails of the sets 8 at the opposite side of the crossing as at 108. By means of this arrangement a train approaching the crossing upon either trackway will be automatically brought to a stop in the event of a train approaching the crossing upon the other trackway. The contact rail of the set 8 of the trackway B joined to the contact rail of the set 8 of the trackway A is connected by way of a wire 111 with the contact rail of the set 11 at the rear thereof. To illustrate, should a train be moving along the trackway B in the direction of the arrow 109 and a car or train moving along the trackway A in the direction of the arrow 110, the two trains will be brought to a standstill, the current flowing as follows, from the feeder 2, through the contact rail of the set of the trackway B, the respective magnet of the motor car on the trackway B, the respective section of the conductor of the set 11, the wire 111, the respective conductor of the set 8, the wire 108, the respective conductor rail of the set 11 of the trackway A, the respective magnet of the car on the trackway A and then back to the common return wire by way of the respective contact rail 8 and the connection between the latter and the return wire of the system. On the other hand, should a train be moving along the trackway A in a direction opposite the arrow 110 and a train moving along the trackway B in a direction opposite the arrow 109, such trains will be brought to a standstill when the outer sets of contact rollers thereof engage the contact rails of the sets 4 and 7 immediately adjacent to the point of intersection of the trackway, current flowing from the feeder 2, to the trackway A, through the wire 5, the outer contact rail of the set 4, the particular magnet on the train operating over the trackway A, the contact rail of the set 7, the contact rail of the set 4 of the trackway B connected with the first-mentioned rail of the set 7, through the particular magnet on the train operating over the trackway B, the contact rail of the set 7, and back to the return wire 3 by way of the wire connecting the last-mentioned contact rail with such return conductor.

In Fig. 12 of the drawings, we have illustrated the connection between the various sets of contact rails of two double track railroads at a grade crossing. In this figure 112 designates the lines of rails of one road for trains traveling in one direction and 113 indicates the lines of rails for trains traveling in the opposite direction over the same road, while 114 designates the lines of rails of the other road for trains traveling in one direction and 115 the lines of rails of the last-named road for trains traveling in the opposite direction. In this embodiment of the invention, the contact rails of the sets of the various trackways are eliminated at the point of intersection and the contact rail of the set 7 of the trackway 112 at one side of the crossing is connected by way of a wire 116 with the contact rail of the set 7 of the trackway 114 at the remote side of the crossing. Similarly, the contact rail of the set 7 of the trackway 115 at one side of the crossing is connected with the contact rail of the set 7 of the trackway 113 by a wire 117. Likewise, the set of contact rails 11 of the trackway 112 is connected with the set of contact rails 11 of the trackway 115 by way of a wire 118, while the set of contact rails 11 of the trackway 113 at one side of the crossing is connected with the set of contact rails 11 of the trackway 114 at one side of the crossing by way of a conductor 119. Thus, it will be seen that two trains traveling along the intersecting trackways and approaching the crossing simultaneously will be automatically brought to a standstill so as to avoid a collision. For instance, should a train be approaching the crossing on the trackway 114 and moving in the direction of the arrow 120 and a train traveling along the trackway 113 in the direction of the arrow 121 both trains will be brought to a standstill as soon as the inner set of contact rollers of the train on the trackway 114 bridge the rails of the sets 8 and 11 immediately adjacent to the crossing and the contact wheels of the train on the trackway 113 bridge the contact rails of the sets 8 and 11 immediately adjacent to the crossing, current flowing from the feeder, through the contact rail of the set 8 of the trackway 113, the respective magnet of the motor car, the adjacent contact rail of the set 11, the wire 119, the respective rail of the set 11 of the trackway 114, the respective magnet of the car on such trackway and the adjacent contact rail of the set 8, back to the common return wire. Should a train be approaching the crossing on the trackway 114 and a train approaching the crossing on the trackway 112, the last-mentioned train traveling in a direction opposite from the arrow 121, such trains will be brought to a standstill as soon as the outer set of contact rollers of the train on the trackway 114 bridge the rails of the sets 4 and 7 immediately adjacent to the crossing and the contact wheels on the trackway 112 bridge the contact rails of the sets 4 and 7 immediately adjacent to the crossing, current flowing from the feeder 2, parallel with the trackway 114 to the contact rail of the set 4, through the particular magnet on the train, the contact rail of the set 7, the conductor 116, the contact rail of the set 7 of the trackway 112 connected with the conductor 116, through the particular magnet of the train on the trackway 112, the corresponding contact rail of the set 4, and back to the common return conductor 3. Trains approaching the crossing on the trackways 113 and 115 will be brought to a standstill when the outer sets of contact rollers thereof engage the contact rails of the sets 4 and 7 immediately adjacent to the crossing, current flowing from the feeder 2, parallel with the trackway 115, through the contact rail of the set 4 of the trackway 115 immediately in advance of the crossing, the particular magnet on the train, the contact rail of the set 7, the conductor 117, the contact rail of the set 7 of the trackway 113, connected with the last-mentioned conductor, the particular magnet on the train on the trackway 113, the corresponding contact rail of the set 4 of the trackway 113, and back to the common return conductor 3.

In Fig. 13 of the drawings, we have illustrated a system of manual control whereby a train operating between two stations may be brought to a stop by the operator in either station. In this form of the invention, one end of each contact rail of the sets 11 and 7 between the stations is connected by way of a conductor 122 with one station and the opposite end connected by way of a conductor 123 with the other station and the station end of each conductor 122, 123 is connected with the pivot end of a switch blade 124 movable into and out of engagement with a contact 125, the contacts 125 of the switches within each station being connected by way of a wire 126 with the common return wire 3. Thus, a train upon any section of the trackway between two stations may be automatically brought to a standstill by the operator in either station. For example, should a train be in the section $d$ of the trackway between the stations and the operator in the station at the left of Fig. 14 desire to stop such train, the switch connected with the conductor 122 of the contact rail of the set 7 within the section $d$ is closed whereby current flows from the feeder, through the respective contact rail of the set 4, the respective magnet on the train, the respective contact rail of the set 7, the wire 122, the closed switch and back to the return wire by way of the wire 126. On the other hand, should the operator in the station at the right of Fig. 14 wish to stop a train in section $f$ the respective switch of the conductor 123 connected with the contact rail of the set 7 within the section $f$ is closed whereby current flows from the feeder, to the respective contact rail of the set 4, the respective contact rail of the set 7, conductor 123, the switch, and back to the common return wire by way of the wire 126.

When a station operator desires to stop a train in a particular section of the trackway under the control of his station, he may close all of the switches of the particular set so as to assure the stopping of the train and as all of the switches are closed the corresponding bell 127 will sound. By now opening the switches individually, the station operator can determine upon which section of the trackway the train is present, as the bell will remain silent when the switch of the particular section is open, thereby advising the station agent of the position of the train. If desired, a suitable signaling system may be employed and signals given in the station as the train proceeds along the trackway from section to section, thus enabling the station agent to bring the train to a standstill by the closing of the switch corresponding to the signal.

From the foregoing description taken in connection with the accompanying drawings, the construction and mode of operation of our improved train stopping system will be readily apparent. It will be seen that we have provided a train stopping system whereby head on and rear end collisions are prevented; section hands working on the trackway protected and traffic under complete automatic and manual control so that the possibility of accidents from any cause whatever is practically eliminated.

While we have herein shown and described certain preferred forms of our invention by way of illustration, we wish it to be understood that we do not limit or confine ourselves to the precise details of construction herein described and delineated, as modification and variation may be made within the scope of the claims without departing from the spirit of the invention.

An electric bell 127 is connected in each wire 126 so that the station agent will be advised when the train within the particular section of track has been stopped.

At highways crossing double tracks, the wire 99 will be connected with the contact rail of the set 7 of one trackway at the approach to the highway while the wire 100 will be connected with the contact rail of the set 7 of the other trackway at the opposite side of the highway.

We claim:

1. In a train stopping system, the combination with a trackway, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, car carried current collectors designed to bridge the coöperating sets of conductors and close the circuit therethrough when the cars are in close proximity to one another, and car carried stopping mechanism under the control of said current collectors.

2. In a train stopping system, the combination with a trackway, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, car carried current collectors designed to bridge the coöperating sets of conductors and close the circuit therethrough when the cars are in close proximity to one another, a switch adapted to connect said trackway with a siding, car carried stopping mechanism under the control of said current collectors, and means under the control of said switch for effecting connections between certain of said conductors at the opposite sides of the switch whereby the car carried stopping mechanism of a train approaching the switch from either direction will be rendered active.

3. In a train stopping system, the combination with a trackway, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, car carried current collectors designed to bridge the coöperating sets of conductors and close the circuit therethrough when the cars are in close proximity to one another, a switch adapted to connect said trackway with a siding, car carried stopping mechanism under the control of said current collectors, and a circuit closer under the control of said switch for effecting connections between certain of said conductors at the opposite sides of the switch whereby the car carried stopping mechanism of a train approaching the switch in either direction will be rendered active.

4. In a train stopping system, the combination with a trackway, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, car carried current collectors designed to bridge the coöperating sets of conductors and close the circuit therethrough when the cars are in close proximity to one another, a switch adapted to connect said trackway with a branch line, sets of conductors for the branch line corresponding with those of said trackway, and means for effecting connections between certain of said conductors at the opposite sides of the switch on said trackway whereby the circuit will be closed through said current collectors on a train approaching the switch from either direction, and car carried stopping mechanism under the control of said current collectors.

5. In a train stopping system, the combination with a trackway, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, car carried current collectors designed to bridge the coöperating sets of conductors and close the circuit therethrough when the cars are in close proximity to one another, car carried stopping mechanism under the control of said current collectors, a branch line switch connected with said trackway, sets of conductors for the branch line corresponding with those of the trackway, and a switch controlled circuit closer for effecting connections between certain of said conductors at the opposite sides of said switch on said trackway and between the various sets of conductors of the branch line whereby the car carried stopping mechanism of a train approaching the switch from either direction on said trackway and from said branch line will be rendered active according to the position of the switch.

6. In a train stopping system, the combination with a trackway and a highway intersecting the same, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, said sets of conductors being arranged at opposite sides of the highway, a highway gate, a circuit closer controlled by said gate and normally closed, connections between said circuit closer and the contact rails of said second set at opposite sides of the crossing, car carried current collectors designed to bridge the coöperating sets of conductors and close the circuit therethrough in the normal condition of said circuit closer when a train approaches the highway crossing from either direction, and signals connected in circuit with said circuit closer and adapted to sound upon the closing of the circuit.

7. In a train stopping system, the combination with intersecting lines of trackways, of a set of conductors arranged longitudinally of each trackway and spaced apart and connected alternately with feed and return wires of an electric circuit, a second set of conductors coöperating with the first set and arranged longitudinally of each trackway and spaced apart and each of a length corresponding to the length of two of said first conductors and parallel therewith, a third set of conductors along each trackway similar to said first set, a fourth set similar to said second set and staggered relatively thereto and coöperating with said third set, car carried current collectors designed to bridge the coöperating sets of conductors and close the circuit therethrough when the cars are in close proximity to one another, car carried stopping mechanism under the control of said current collectors, and connections between corresponding contact rails of the intersecting trackways whereby cars approaching the crossing simultaneously upon the intersecting trackways will be brought to a standstill.

8. In a train stopping system, the combination with a trackway, and stations along the trackway and spaced apart, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, the coöperating conductors of the sets serving to divide the trackway into sections, car carried current collectors designed to bridge the coöperating sets of conductors and close the circuit therethrough when the cars are in close proximity to one another, car carried stopping mechanism under the control of said current collectors, and means operable from each station whereby a train within any section between such station and an adjacent station may be automatically stopped.

9. In a train stopping system, the combination with a trackway, of a set of conductors arranged longitudinally of the trackway and spaced apart and connected alternately with feed and return wires of an electric circuit, a second set of conductors coöperating with the first set and arranged longitudinally of the trackway and spaced apart and each of a length corresponding to the length of two of said first conductors and parallel therewith, a third set of conductors similar to said first set, a fourth set similar to said second set and staggered relatively thereto and coöperating with said third set, car carried current collectors designed to bridge the coöperating sets of conductors and close the circuit therethrough when the cars are in close proximity to one another, car carried stopping mechanism under the control of said current collectors, and a portable instrument adapted to bridge the coöperating sets of conductors and embodying audible signals adapted to be actuated upon a train approaching the device within a prescribed distance.

In testimony whereof we affix our signatures in presence of two witnesses.

ANGELO MAINARDI.
SEVERINO MAINARDI.
HENRY MAINARDI.

Witnesses:
JOHN J. McCARTHY,
E. EDMONSTON, Jr.